Aug. 18, 1953  M. J. WOOLDRIDGE ET AL  2,649,162
MONOWHEEL TRACTOR
Filed Oct. 20, 1947  2 Sheets-Sheet 1
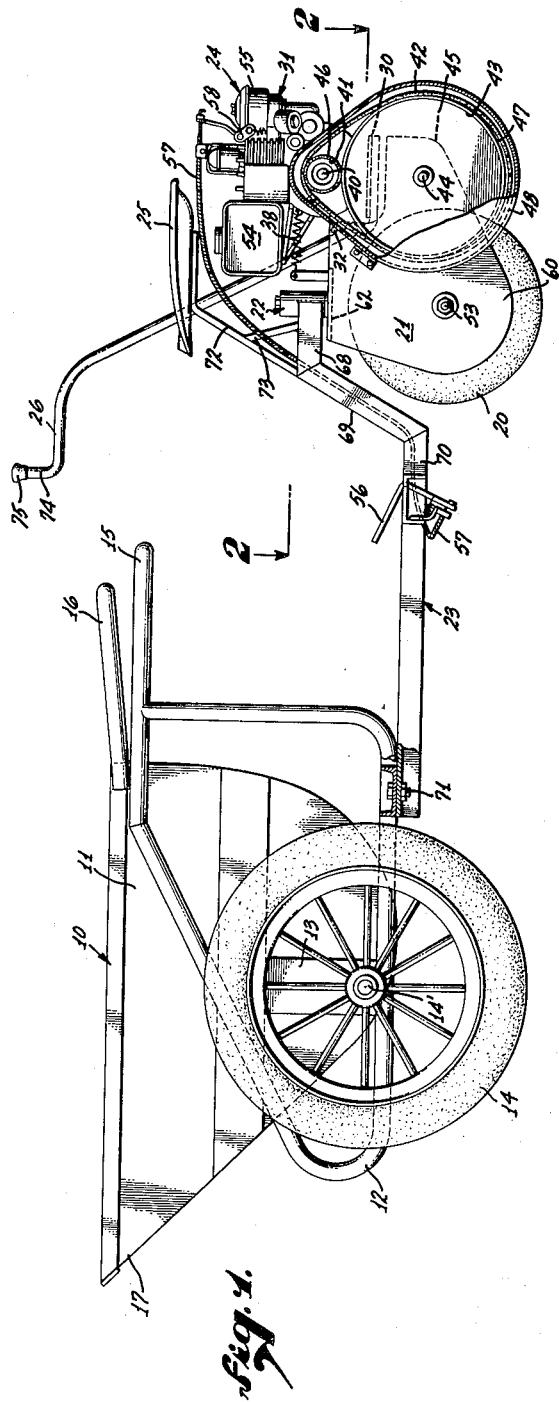
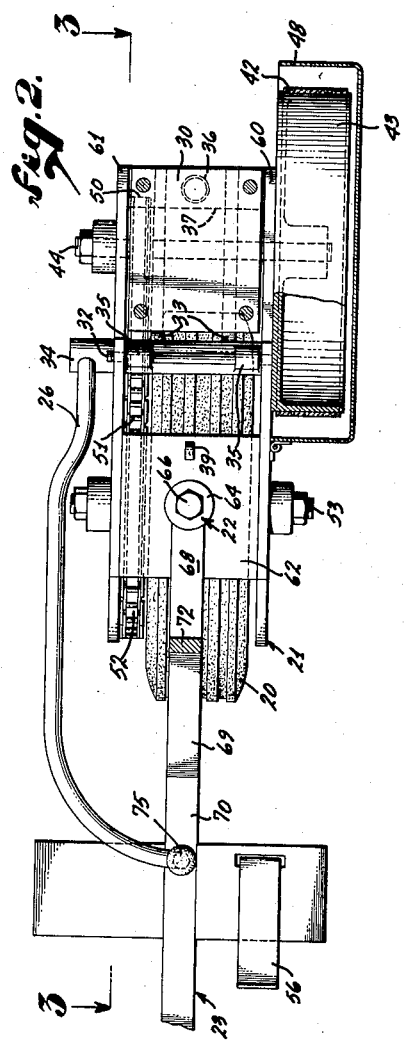
INVENTORS:
MARION J. WOOLDRIDGE
GEORGE P. CARVER
BY Huebner, Maltby
and Beehler
ATTORNEYS.

Aug. 18, 1953  M. J. WOOLDRIDGE ET AL  2,649,162
MONOWHEEL TRACTOR
Filed Oct. 20, 1947  2 Sheets-Sheet 2
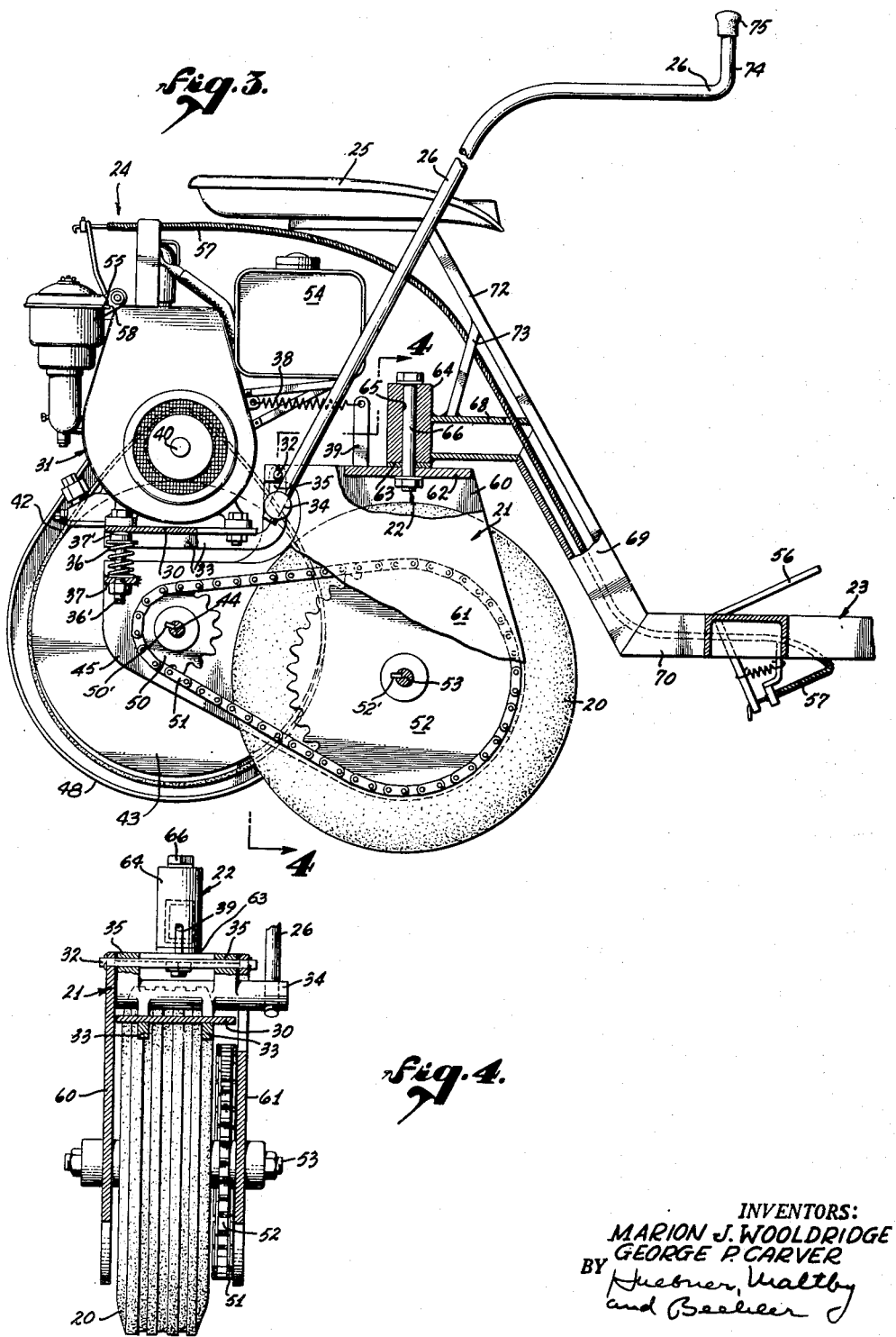
INVENTORS:
MARION J. WOOLDRIDGE
GEORGE P. CARVER
BY Huebner, Maltby
and Beehler
ATTORNEYS.

Patented Aug. 18, 1953

2,649,162

UNITED STATES PATENT OFFICE 2,649,162

MONOWHEEL TRACTOR

Marion J. Wooldridge, Burbank, and George P. Carver, Northridge, Calif., assignors to Garlinghouse Brothers, Los Angeles, Calif., a copartnership Application October 20, 1947, Serial No. 780,970

10 Claims. (Cl. 180—13)

This invention relates to a power operated device for propelling a wheeled vehicle by pushing or drawing and one particularly well adapted for use with vehicles which can be steered by the same device which is used for the pushing or drawing.

Certain types of hand trucks and vehicles in the nature of push carts and dump trucks are ordinarily pushed about and steered by hand. On a great many occasions these trucks or carts have no more than two wheels on the axle by which the truck body is supported and are provided with a handle at the rear, or sometimes in the front, which can be grasped by the operator and used simultaneously for both pushing and steering. Two-wheeled vehicles of this particular description are more in demand where loads are heavy and where a wheelbarrow could not conveniently handle them.

A popular type of vehicle of this description is commonly identified as a concrete dump truck which has found very wide acceptance on construction work. The concrete dump truck is characterized by the provision of a rather ample body, one end of which is spout-like in form and which is supported by wheels of relatively large diameter. The body ordinarily is suspended in a tiltable manner on the wheels so that while a frame which supports it remains fixed in position the body can be tilted. Although these trucks are designed to carry heavy loads, they are not usually made any larger than can be pushed and handled by a single operator.

As the demand for more rapid work on concrete construction has increased, coupled at the same time with a very substantial increase in the cost of labor, more rapid hauling and pouring of concrete has become a necessity. On many occasions, also, it is particularly convenient to be able to move concrete in trucks up inclines which are ordinarily too steep for a single operator to push a full laden truck.

It is, therefore, among the objects of the invention to provide a new and improved power driven device or auxiliary power drive, which is applicable to carts and trucks heretofore pushed or pulled by hand, by means of which the truck or cart may be moved to a suitable position and there dumped.

Another object of the invention is to provide a new and improved auxiliary power drive for trucks and carts heretofore pushed and steered by hand which is capable of steering the cart or truck at the same time that it is being propelled.

Still another object of the invention is to provide a new and improved power drive for carts and trucks ordinarily pushed and steered by hand which incorporates into a single unit a device attachable to the truck which can be ridden by the operator and which is adapted to move the truck about with particular ease while at the same time providing means to steer the truck while it is being propelled by the drive.

Also among the objects of the invention is to provide a new and improved monowheel drive for a wheeled vehicle which is easy to manipulate, both with respect to forward and reverse operation, which can be steered with equal facility, which can be maneuvered around a small area so that the vehicle may be conveniently loaded and unloaded, and which also is of a construction sufficiently simple that it can be easily serviced and repaired.

A further object of the invention is to provide a control means for a monowheel drive by virtue of which an operator riding with the drive can both steer and control the drive by manipulation of a single stick, rod or other suitable control element.

Also among the objects of the invention is to provide a monowheel drive applicable to trucks and push carts of the standard type and particularly two-wheeled trucks and carts without it being necessary to use anything more than a drawbar or push-bar to connect the monowheel drive to the truck or cart.

With these and other objects in view, the invention consists in the construction, arrangement and combination of the various parts of the device whereby the objects contemplated are attained, as hereinafter more fully set forth, pointed out in the claims and illustrated in the accompanying drawings, in which:

Figure 1 is a side elevational view of the device shown in position attached to a conventional concrete truck with portions of the device broken away and shown in section.

Figure 2 is a plan view of the drive taken on the line 2—2 of Figure 1.

Figure 3 is an elevational sectional view of the drive as viewed on the line 3—3 from the side opposite to that shown in Figure 1.

Figure 4 is a cross-sectional view taken on the line 4—4 of Figure 3.

Although the device herein described may be successfully applied to many different types of vehicles which are usually drawn or pushed by hand, the device is of such character that it can be used with two-wheeled vehicles with particular success, and the illustration described herein has therefore been applied to one such two-wheeled vehicle commonly known as a concrete dump truck.

The concrete truck shown for the purpose of illustration is a two-wheeled truck designed to carry loads of considerable weight and also designed to be manipulated in relatively small areas wherever concrete might need to be dumped into forms. Most frequently, also, trucks of this type are designed to be operated on runways and through spaces not appreciably greater in width than the width of the truck itself.

In the drawings the concrete dump truck 10 is illustrated as comprising a body 11 tiltably supported upon a frame 12 whereupon it is carried by a pedestal 13. Details of the tiltable support have not been included in the description inasmuch as they comprise conventional subject matter commonly known in the trade. The frame 12 is shown as being supported by a pair of wheels 14 of relatively large diameter carried upon an axle or shaft 14' which is journaled in the frame 12.

For pushing the cart about there is provided a push handle 15 which is here shown as comprising a part of the frame. A dump handle 16 is attached to the rear of the tiltable body 11 by means of which the body can be lifted and tilted so that the concrete carried therein can be slid out over a chute-like end 17 of the body.

The monowheel drive comprising the invention is shown as consisting of a wheel 20 supported on a frame 21 connected by means of a pivot support 22 to a member 23 which may be herein considered as a drawbar or perhaps more properly denominated a push bar. A motor, designated generally by the character 24, is attached to the drive wheel 20, and a seat 25 is provided for the driver who, in seated position, is enabled to manipulate and control a stick or steering arm 26 for the proper manipulation of the drive.

By reason of the construction of the device as herein set forth a driver on the seat 25 can manipulate the steering arm 26 to rotate the frame 21 which supports the wheel 20 for steering purposes and also can shift the steering arm in another manner so that the application of power from the engine to the wheel 20 can be directed in either a forward direction, a reverse direction or can be disconnected to effect an idling adjustment.

More specifically the motor drive is incorporated in a motor base 30 upon which is mounted, in the present embodiment, a gasoline engine 31. It is important to note that the motor base 30 is connected to the frame 21 by a tilting connection so that the motor base is adapted to pivot in a vertical direction upon a horizontal axis defined by a shaft 32. As a matter of convenience in the present embodiment the motor base 30 includes a pair of ribs 33 which extend underneath the base and join integrally a boss 34 from which lugs 35 extend upwardly into a pivotal engagement with the shaft 32. The steering arm 26 may be fixed to the extension of the boss 34 whereby with the movement of the steering arm in a vertical plane the motor base 30 can be tilted up and down.

The gasoline engine is provided with a drive shaft 40 which lies in a horizontal plane parallel to the shaft 32. At the end of the drive shaft 40, visible in Figure 1, there is provided a pulley 41 and a belt 42 which extends around a pulley 43 mounted upon a shaft 44. The shaft 44 extends through and is carried by a rear extension 45 of the frame 21. It will be apparent that the shaft 44 and pulley 43 are fixed with relation to the frame 21. Because of the pivotal mounting of the motor base 30 the motor, the drive shaft 40 and the pulley 41 can be tilted or moved with respect to the frame 21 and therefore may be adjusted with respect to the pulley 43.

It is also important to note that the surface of the pulley 41 is provided with a friction tread 46 which is adapted to frictionally engage a corresponding surface 47 of the pulley 43. A protecting guard 48 surrounds both pulleys and the belt 42.

The motor mounting is made such that it will always return to a neutral or idling position subsequent to being driven in either a forward or reverse direction. This is assisted by using a compression spring 36 held in place by a bolt 36', the bolt extending through a suitable aperture in a bracket 37 which is a part of the rear extension 45. A button 37' is mounted at the top of the bolt and may be adjusted with respect to its height by the nut which is threaded upon the bolt.

Ordinarily, the motor base 30 occupies a neutral or idling position. If the steering arm 26 is lifted to reverse the operation, the motor base is tilted downwardly against the reaction of the compression spring 36. As soon as the steering arm is released, however, action of the spring 36 returns the motor base to a neutral position. The neutral position may be properly set by taking up or letting out on the nut which is threaded upon the bolt 36'.

A spring 38 attached to a bracket 39 comprises a counter-balance active when the motor base returns from a forward adjustment to neutral or idling position. When the steering arm 26 is pressed downwardly, the motor base is lifted and operation is in a forward direction. When the steering arm is released, the weight of the motor returns it to neutral position. The spring 38 being against the weight of the motor prevents it from returning too sharply and abruptly from a forward driving position to a neutral position.

From the foregoing description it will become apparent that when the motor base is tilted to an adjustment such that the drive shaft 40 is elevated the belt 42 will become taut and the pulley 43 will be rotated in a direction such that the wheel 20 rotates in a forward moving direction. Conversely, if the steering arm 20 is pulled backwardly and upwardly, the motor base is tilted down to an adjustment wherein the friction surface 46 of the pulley 41 is brought into engagement with the corresponding surface 47 of the pulley 43 and the pulley 43 is rotated in a direction which reverses the direction of rotation of the wheel 20.

In order to transfer the application of power from the pulley 43 to the wheel 20, which may be designated as a traction wheel, there is provided a small sprocket 50 keyed at 50' to the shaft 44, over which extends a chain 51 engaging also a large sprocket 52 keyed, in turn at 52', to a shaft 53. The shaft 53 is likewise the shaft which supports the wheel 20. The relative size and location of the sprockets and chain may best be seen in Figure 3.

It seems sufficient to note that all of the parts of the gasoline engine, including a fuel tank 54 and carburetor 55, are affixed to the gasoline engine or its base 30 and all tilt with it as the base is tilted. Parts of the gasoline engine have not been described in detail inasmuch as engines of conventional construction are used, and these may differ as to detail without affecting the operation of the invention.

For controlling the speed of the motor an accelerator pedal 56 is mounted upon the drawbar 23, and a flexible rod 57 carries movement of the accelerator pedal to a link 58 which controls admission of fuel gas to the carburetor and hence the speed of the operation of the gasoline engine. By reason of the fact that the rod 57 is flexible, it permits of rotation of the engine from side to side as well as a tilt in an upward and downward direction without affecting the adjustment of the throttle with respect to the carburetor.

Although details of the means of mounting the frame 21 upon a suitable drawbar for connection to the truck may vary with different installations, in the example herein chosen for the purpose of illustration the frame 21 is shown as including a left-hand plate 60 and a right-hand plate 61, these being connected by a top plate 62 which forms a support for a bearing 63 adapted to carry the weight transferred by the drawbar to the wheel 20.

A boss 64 of substantial construction is provided with a central chamber 65 through which passes a vertical shaft or bolt 66 by means of which the top plate 62 and hence the frame 21 is pivotally secured to the boss 64. It should be noted in this connection that the pivot connection thus provided forms the sole means of support for the rear of the vehicle which is to be propelled by the monowheel traction drive.

For convenience the drawbar 23 is provided with a short horizontal portion 68 affixed to the boss 64, and from the forward end of the extension 68 a diagonal portion 69 connects the portion 68 with a horizontal portion 70. By this particular construction the horizontal portion 70, which includes the accelerator pedal 56, is permitted to lie at a low level and join the frame 12 of the concrete truck at a correspondingly low level. At the same time the arrangement provides ample space for a traction wheel 20 of the diameter suggested in the drawing.

Any conventional means may be provided for attaching the forward end of the horizontal portion 70 to the frame 12, the means being here illustrated as comprising a bolt and nut connection 71. This connection may be released at will in the event that it is desired to remove the monowheel drive from a given truck.

It is also found to be a matter of considerable convenience to have the seat 25 located approximately above the location of the vertical pivot 22. To this end there is provided a support 72 extending obliquely forwardly and downwardly from the seat into engagement with the portion 69 of the drawbar and a stiffening element 73 for maintaining the support in its position. Located in this general way the traction wheel 20 is immediately below the location of the seat, which location aids appreciably in the ease and exactness of manipulation of the monowheel drive when it is being rotated for steering purposes.

While the steering arm 26 may take various forms, it is helpful to provide the arm with an upturned handle 74 terminating in a knob 75. This type of construction aids the operator in differentiating between the rotational function of the steering arm for steering only, and the lifting and lowering of the steering arm which controls the direction of application of power to the wheel 20 so that it can be moved forward, reversed or idled.

It should further be noted that the seat 25 and the monowheel drive itself are mounted sufficiently close to the vehicle so that the handles 15 and 16 of the vehicle are within easy reach of the driver when he is seated upon the seat.

The relative locations of the various parts take into consideration maneuverability of the device and ease of operation to the extent that heavy loads in the vehicle can be moved with ease. The drive is capable of operation with equal facility in a reverse as well as a forward direction, a factor appreciably improving the maneuverability. At the same time the construction is one involving relatively little expense inasmuch as the customary clutch is dispensed with, and no provision need be made with respect to the engine itself for reversing its operation other than the simple parts herein identified. All parts of the device remain open and easily accessible and may, therefore, be readily serviced, and where necessary removed and replaced.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent structures.

Having described our invention, what we claim as new and desire to secure by Letters Patent is:

1. An auxiliary motor drive for a wheeled vehicle comprising an implement frame, a traction frame, a wheeled support for said traction frame providing traction and adapted to support part of the weight of the vehicle, vertical pivot means pivotally connecting said traction frame to said implement frame whereby one of said frames is adapted to rotate in a horizontal plane relative to said other frame, a motor base, horizontal transverse pivot means tiltably mounting said base on said traction frame, a motor on said base, a drive connection between the motor and the wheeled support comprising a motor drive shaft, a drive element rotatably mounted on said traction frame, and a positive drive connection between the drive element and the wheeled support, means forming a forward drive connection from said drive shaft to said drive element in one position of tilt of the motor and means forming a reversible drive connection between said drive element and said drive shaft in another position of tilt of said motor wherein one position of the motor establishes a forward drive and another position establishes a reverse drive, a driver seat on the implement frame, a steering arm fixed on the motor base for movement therewith and extending to a location adjacent said driver seat and adapted on movement thereof in one path to tilt the motor to different positions of adjustment and on movement thereof in another path to steer the vehicle.

2. An auxiliary motor drive for a two-wheeled vehicle comprising an implement frame, a drawbar adapted for attachment to the frame, a driver seat on the implement frame above the drawbar, a traction frame, vertical pivot means pivotally connecting said traction frame to said drawbar whereby one of said frames is adapted to rotate in a horizontal plane relative to said other frame, a wheeled support for said traction frame providing traction, a motor base, horizontal transverse pivot means tiltably mounting said base on said traction frame, a motor on said base, a drive connection between the motor and the wheeled support comprising a motor drive shaft, a reversible drive between the drive shaft and the wheeled support, said reversible drive comprising a rotatable means on the traction frame, means forming a forward drive connection between the motor drive shaft and said rotatable means in one position of tilt of the motor and means forming a reverse drive connection between the motor drive shaft and said rotatable means in another position of tilt of the motor thereby to effect respective forward and reverse motion of the wheeled support, a steering arm attached to the motor base for movement therewith and extending to a location adjacent said driver seat adapted on movement thereof in one path to change the position of tilt of the motor and on movement in another path to steer the motor drive in its relation to the vehicle.

3. An auxiliary motor drive for a two-wheeled vehicle comprising an implement frame, a drawbar extending from the frame, a driver seat secured to the drawbar, a traction frame, vertical pivot means pivotally connecting said traction frame to said drawbar whereby one of said frames is adapted to rotate in a horizontal plane relative to said other frame, a wheeled support for said traction frame providing traction, a motor base, horizontal transverse pivot means tiltably mounting said base on said traction frame, a motor on said base, a drive connection between the motor and the wheeled support comprising a motor drive shaft having a pulley thereon, a pulley on the traction frame in circumferential alignment with and spaced from the first pulley, means forming a positive drive between the last pulley and the wheeled support, and a belt between said pulleys, said motor having one position of tilt wherein said belt is taut and adapted to drive the second pulley in one direction, the pulleys having positions of contact upon a second position of tilt of said motor wherein said second pulley is driven in an opposite direction, and a steering arm attached to the motor base and adapted for movement therewith and extending to a location adjacent the driver seat, said arm being adapted on movement thereof in selected horizontal and vertical directions to respectively control steering and direction of operation of the drive.

4. A drive unit for a wheeled vehicle comprising an implement frame, a drawbar adapted to extend endwise from the frame, a traction frame and traction wheel means, vertical pivot means pivotally connecting said traction frame to said drawbar whereby one of said frames is adapted to rotate in a horizontal plane relative to said other frame for steering purposes, a seat on the implement frame in fixed location relative to the drawbar and located at the same end of said drawbar as the traction wheel means, power means adapted to drive said traction wheel means comprising a motor base, means shiftably mounting said motor base on the traction frame for movement in a direction parallel with the direction of motion of the traction wheel means, a motor on the base having a drive shaft thereon, means forming a reversible drive connection between the drive shaft and the traction wheel means including means movably mounted on the traction frame and responsive to a shift of the motor to different positions thereof to effect alternatively a reverse and direct drive operation of the traction wheel means by the motor and a control stick attached to the motor and adapted to move therewith and extending from the motor to a position at the same end of the drawbar as the traction wheel means and adjacent the seat, said stick being pivotally mounted on the traction frame whereby a tilting movement of said stick is adapted to shift said motor and said movable means alternatively to reverse and forward drive positions.

5. A drive unit for a wheeled vehicle comprising an implement frame, a drawbar adapted to extend endwise from the frame, a traction frame and traction wheel means, vertical pivot means pivotally connecting said traction frame to said drawbar whereby one of said frames is adapted to rotate in a horizontal plane relative to said other frame, said traction frame being adapted to be rotated for steering purposes, a seat on the implement frame in fixed location relative to the drawbar, said traction means moving upon a horizontal axis, and power means adapted to drive said traction wheel means comprising a motor base, horizontal transverse pivot means tiltably mounting said motor base on a horizontal axis upon the traction frame parallel to said axis of movement of said traction wheel means, a motor on the base having a drive shaft parallel to said horizontal axis, a drive element spaced circumferentially from the drive shaft, a parallel shaft for the drive element fixed upon the traction frame and positive drive means between the drive element and said traction wheel means, and a movable reversible drive means between said drive shaft and said drive element, said drive means having one position for forward motion and another position for reverse motion in response to the tilt of said motor, and a control stick pivotally mounted on the traction frame and adapted for movement therewith extending from the motor to a position adjacent the driver seat, a tilting movement of said stick being adapted to tilt the motor to control the direction of drive of the unit.

6. A detachable drive unit for a wheeled vehicle comprising an implement frame, a drawbar adapted to extend centrally rearward of the frame, a traction frame including traction means, vertical pivot means pivotally connecting said traction frame to said drawbar whereby one of said frames is adapted to rotate in a horizontal plane relative to said other frame, said traction frame adapted to be rotated about said vertical pivot means for steering purposes, a seat on the drawbar for a driver, said traction means moving upon a horizontal axis and power means adapted to drive said traction means comprising a motor base, horizontal transverse pivot means tiltably mounting said base on said traction frame parallel to the axis of said traction means, a motor on the base having a drive shaft parallel to said horizontal pivot means of the motor base and farther removed from the axis of said traction means than the axis of the motor base and a pulley on the drive shaft, a second pulley circumferentially spaced from the first pulley, a shaft for the second pulley parallel to the drive shaft and fixed upon the traction frame and positive drive means between the second pulley and said traction wheel means, a belt between the pulleys, and a control stick tiltably mounted on the traction frame and adapted for movement therewith extending from the motor to a position adjacent the seat, a vertical tilting movement of said stick being adapted to tilt said drive shaft alternatively to reverse and forward drive positions wherein in one position the pulleys are in direct driving contact and in another position the belt is in driving contact.

7. A monowheel drive for a wheeled vehicle comprising an implement frame, a drawbar adapted to be attached to the frame, a traction frame, vertical pivot means pivotally connecting said traction frame to said drawbar whereby one of said frames is adapted to rotate in a horizontal plane relative to said other frame, a traction wheel on the frame, a motor base forming part of the frame and a movable attaching means between said frame and said motor base, a motor mounted on the motor base, a releasable drive means between the motor and the traction wheel, said drive means having forward, reverse and neutral adjustments corresponding to respective different positions of the motor base relative to the traction frame, a driver seat secured to and located above the drawbar, and steering means connected to the motor and adapted for movement therewith, said steering means having a portion thereof extending to a location adjacent the driver seat and adapted to move in one direction for steering said motor being responsive to movement of said steering means in another direction to effect said forward, reverse and neutral adjustments.

8. A monowheel drive for a wheeled vehicle comprising an implement frame, a drawbar extending from the frame, a traction frame, vertical pivot means pivotally connecting said traction frame to said drawbar whereby one of said frames is adapted to rotate in a horizontal plane relative to said other frame, a traction wheel on the traction frame, a motor base, a movable attaching means between the motor base and the frame, a motor mounted on the motor base and a reversible drive means between the motor and the traction wheel, said drive having forward, reverse and neutral adjustments corresponding to respective different positions of the motor base relative to the frame, a driver seat fixed to the drawbar, and means connected to the motor and adapted for movement therewith having a plurality of adjustments respectively for steering and for controlling the forward, reverse and neutral adjustments of said drive.

9. A direction control drive for a vehicle comprising an implement frame, a drawbar adapted to extend endwise of said frame, a traction frame beneath the drawbar, vertical pivot means pivotally connecting said traction frame to said drawbar whereby one of said frames is adapted to rotate in a horizontal plane relative to said other frame, a seat support on the drawbar on one side of the vertical pivot means, a driver seat on the seat support upon and above the vertical pivot means, a traction wheel on the traction frame located beneath the seat and the vertical pivot means, a motor on the frame located beneath the seat and having a drive connection to the traction wheel, and a steering arm connected to the traction frame and extending to a position adjacent said driver seat, said steering arm having a handle adapted upon rotation to rotate the traction frame and traction wheel for steering the vehicle.

10. An auxiliary motor drive for a wheeled vehicle comprising an implement frame, a driver seat on said implement frame, a traction frame, a wheeled support for said traction frame providing traction and adapted to support part of the weight of the vehicle and a vertical pivotal connection means between the implement frame and the traction frame, a motor unit including a motor base, a horizontal transverse pivot means tiltably mounting said base on said traction frame and a motor on the base, a drive connection between the motor and the wheeled support comprising a motor drive shaft, a rotatable drive element on the traction frame, a positive drive means between the drive element and the wheeled support, and a reversible drive connection means between said drive element and the drive shaft responsive to the position of tilt of said motor wherein one position of the motor establishes a forward drive and another position establishes a reverse drive, a steering arm attached to the motor unit and adapted for movement therewith and extending to a location adjacent the driver seat, said arm being adapted on movement thereof in one path to tilt the motor to different positions of adjustment and on movement thereof in another path to steer the vehicle.

MARION J. WOOLDRIDGE.
GEORGE P. CARVER.

References Cited in the file of this patent

UNITED STATES PATENTS

| Number | Name | Date |
|---|---|---|
| 572,051 | Duryea | Nov. 24, 1896 |
| 881,545 | Caps et al. | Mar. 10, 1908 |
| 1,124,162 | Monahan | Jan. 5, 1915 |
| 1,186,310 | Hackney | June 6, 1916 |
| 1,881,505 | Gravely | Oct. 11, 1932 |
| 2,457,821 | Johnson | Jan. 4, 1949 |
| 2,482,203 | Peterson et al. | Sept. 20, 1949 |

FOREIGN PATENTS

| Number | Country | Date |
|---|---|---|
| 502,163 | France | Feb. 16, 1920 |